United States Patent Office 2,736,885
Patented Feb. 28, 1956

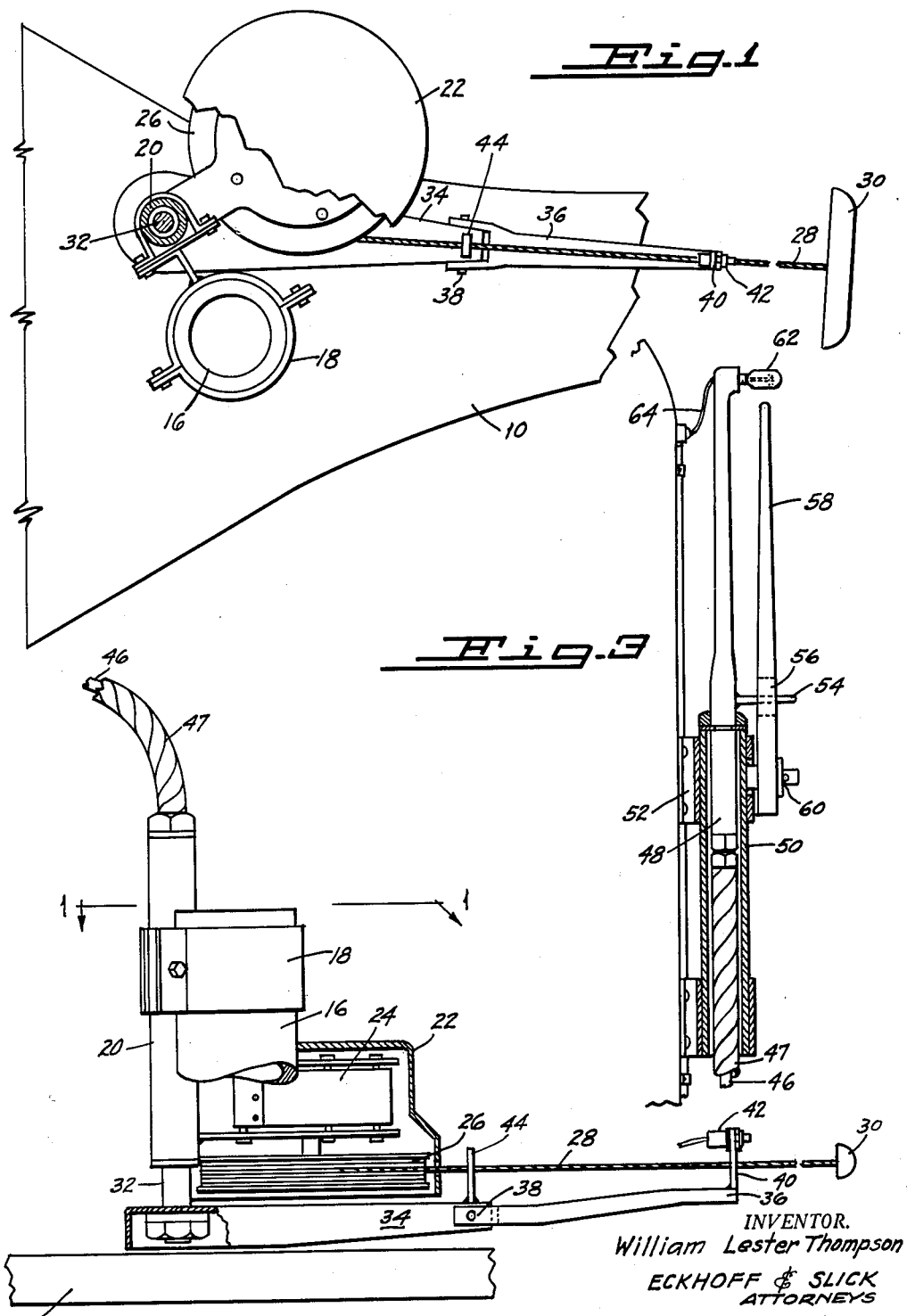

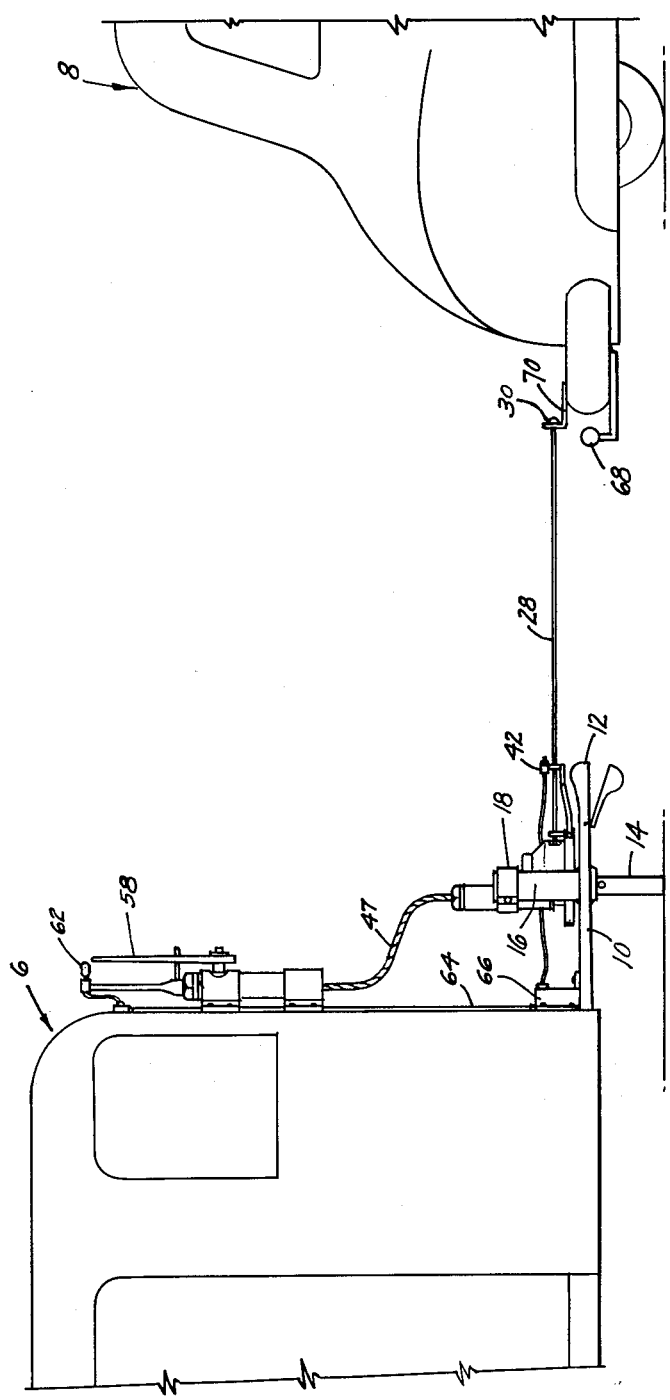

2,736,885

TRAILER AND TOWING VEHICLE ALIGNING INDICATOR

William Lester Thompson, Orland, Calif.

Application March 14, 1955, Serial No. 494,200

3 Claims. (Cl. 340—282)

This invention relates to a device for enabling one to back a towing vehicle into proper alignment with a trailer for coupling the trailer to the towing vehicle. The invention will be particularly described with respect to a device for hooking a house trailer to an automobile, but it will be obvious that the device can be used with any type of trailer and any type of towing vehicle.

It is ordinarily difficult to back a car into proper alignment with a trailer for the purpose of coupling the trailer to the car since it is impossible to see the car hitch from the driver's position and it is impossible to see the trailer hitch when the car and trailer are close together. Many house trailers are so heavy that it is difficult to shift the position of the trailer by hand and it is important that the car be brought into the exact position for coupling the trailer to the car.

According to the present invention, a device is provided whereby an easily visible pointer shows the driver of the car whether it is backing up into correct alignment with the trailer and wherein a light flashes at the exact moment that the ball coupling of the car comes into alignment with the socket coupling of the trailer.

In general, the object of the present invention is accomplished by providing a spring loaded reel of wire or cord attached to the trailer with an indicator thereon to show whether the cord is being extended straight to the front of the trailer.

In the drawings forming a part of this application:

Figure 1 is a plan view of the device of the present invention on the lines 1—1 of Figure 2.

Figure 2 is a side elevation of the take-up reel and flexible arm assembly.

Figure 3 is a view, partly in section, of the indicating device of the present invention.

Figure 4 is an elevational view showing the manner in which the device of the present invention is normally used.

Referring now to the drawings by reference characters, there is shown a trailer, generally designated 6, to which an automobile 8 may be hitched. The trailer has a forward extending tongue 10 which terminates in a split socket 12 for towing the trailer. Some means is provided to support the weight of the front end of the trailer when it is not supported by a car. In a simplified form, this can be a post 14 which extends upwardly through the tongue 10 and into post 16 which is attached to the tongue of the trailer. A clamp 18 is fastened to the post 16 which in turn supports a hollow tube 20, to which is attached a reel housing 22. The reel housing contains a take-up spring 24 to which is attached a reel 26. Wound on the reel 26 is a wire or cord 28. The spring and reel are of the conventional take-up type so that as one pulls out on the cord 28, the spring is wound, which tends to pull a cord back onto the reel. The far end of the cord 28 terminates in a handle member 30. Pivoted for rotation in the tube 20 is the operating rod 32. The operating rod 32 is rigidly attached to folding arm 34, which terminates in an extended portion 36. The extended portion 36 is pivoted to the portion 34 at 38, and at the extremity of the arm 36 is an upstanding arm 40, which has a hole therein which constitutes a guide post for the cord 28 and also has attached thereto a single pole electric switch 42 of the momentary make type. Arm 34 is also provided with a second guide 44. As can be seen from Figure 2, the arm 34 is attached to the operating rod 32 so that as the arm 34 is turned from side to side, the rod 32 is rotated. Leading from the operating rod 32 is a flexible shaft 46 having a sheath 47. Flexible shaft 46 leads to rod 48, which is mounted for rotation in the housing 50, which in turn is attached to the body of the trailer by means of a clamp 52. The member 48 has a pin 54 extending therefrom which extends through a slot 56 in the indicator 58, which is pivoted to the housing 50 at point 60. The top of the member 48 has a small light bulb 62, which is attached by means of suitable wiring 64 to the battery container 66, which in turn is connected to the switch 42.

The auto 8 is provided with a conventional ball type hitch 68 and in addition is provided with a slotted member 70, into which handle 30 can easily be inserted.

In operation, the car is parked some distance in front of the trailer in approximate line with it and the handle 30 is then pulled, extending the cord 28 until it reaches the car, whereupon the handle 30 is slipped into the slot of the bracket 70. Since the tongue 36 will be held in line with the cord 28, the indicator 58 will indicate when the car is directly in line with the trailer. If the car gets off to one side, the indicator will be deflected from one side to the other. Therefore, the driver need only attach the cord 28 to the car, then back the car up while watching the indicator 58, which will clearly tell him whether he is in line with the trailer or off to one side. As the ball 68 gets directly under the socket member 12, the end of the bracket 70 will touch the switch 42, causing the light 62 to light, so that the driver will know that he is in the exact position for coupling on the trailer. On the other hand, should the driver over-shoot his mark and back into the device, no harm will be done since the tongue 36 will fold at the hinge point 38, protecting the device.

It will be obvious to those skilled in the art that the exact arrangement of parts shown need not be used but that the objects of the present invention can be accomplished with similar parts arranged in other manners.

I claim:

1. A device of the character described having a spring loaded take-up reel adapted to be attached to a trailer, a cord on said reel adapted to be attached to a towing vehicle, a guide adjacent said take-up reel through which the cord passes, said guide being adapted to turn in the direction said cord is extended, and an indicator turning with said guide and being visible from the towing vehicle showing the direction in which the cord is extended.

2. The device of claim 1 wherein a light is provided, said light being controlled by a switch on said guide, said switch being actuated by contact with a towing vehicle.

3. An indicating device adapted to be attached to a trailer comprising a spring loaded take-up reel adapted to be attached to said trailer, a cord on said reel adapted to be attached to a towing vehicle, a guide adjacent said take-up reel through which said cord passes, said guide being rotatably mounted to turn in the direction the cord is extended, a flexible shaft turning with and connecting said guide to an indicating device mounted on the trailer whereby movement of said guide is caused to actuate said indicating device, a switch adjacent said guide and being actuated by contact with a towing vehicle and a light connected to said switch.

References Cited in the file of this patent

UNITED STATES PATENTS

| 541,286 | Moore et al. | June 18, 1895 |
| 2,050,948 | Hekking | Aug. 11, 1936 |

FOREIGN PATENTS

| 706,200 | Great Britain | Mar. 24, 1954 |